(12) United States Patent
Onami

(10) Patent No.: US 7,280,698 B2
(45) Date of Patent: Oct. 9, 2007

(54) METHOD AND APPARATUS FOR DISPLAYING NOTICEABLE IMAGE AND SYSTEM FOR REMOTELY MONITORING IMAGE

(75) Inventor: Yuichi Onami, Iruma (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 716 days.

(21) Appl. No.: 10/659,393

(22) Filed: Sep. 11, 2003

(65) Prior Publication Data
US 2004/0057625 A1 Mar. 25, 2004

(30) Foreign Application Priority Data
Sep. 24, 2002 (JP) ............................. 2002-277052

(51) Int. Cl.
*G06K 9/36* (2006.01)
*G06K 9/46* (2006.01)

(52) U.S. Cl. ...................... 382/236; 382/233; 382/232; 382/250; 382/251; 382/238; 375/240.14; 375/240.16; 375/240.02; 375/240.2

(58) Field of Classification Search ................ 382/236, 382/232, 233, 238, 250, 251; 375/240.14, 375/240.16, 240.02, 240.2; 348/404.1, 416.1, 348/415.1; 386/52, 68, 111
See application file for complete search history.

(56) References Cited

U.S. PATENT DOCUMENTS 5,440,345 A * 8/1995 Shimoda ................ 375/240.14
5,587,806 A * 12/1996 Yamada et al. ................ 386/68
5,689,307 A * 11/1997 Sugahara et al. ......... 348/419.1
5,856,848 A 1/1999 Fujiwara et al.
2004/0028282 A1* 2/2004 Kato et al. ................... 382/236

FOREIGN PATENT DOCUMENTS

GB 2335105 9/1999

OTHER PUBLICATIONS

International Standard ISO/IEC 13818-2: 2000 (E), "Information Technology-Generic Coding of Moving Pictures and Associated Audio Information: Video", vii, viii.
International Standard ISO/IEC 13818-2: 2000 (E), AITU-T Rec., H.262 (200 E), pp. 12, 16, 27, 36, 47, 61.

* cited by examiner

*Primary Examiner*—Matthew C. Bella
*Assistant Examiner*—Ali Bayat
(74) *Attorney, Agent, or Firm*—Mattingly, Stanger, Malur & Brundidge, P.C.

(57) ABSTRACT

Coded, or compressed data of moving pictures is received through a transmission path. The picture type of the compressed data is detected from the received compressed data of moving pictures. If the picture type of the received compressed data of moving pictures is found to be intra picture, predetermined image data is supplied to a monitor so that it can be displayed on the monitor, and also to a memory so that it can be stored in the memory. If the picture type of the detected compressed data is found to be inter picture, the image data resulting from decoding the received compressed data and the image data stored in the memory are added together, and the data resulting from the addition is supplied to the monitor so that it can be displayed on the monitor and also to the memory so that it can be stored in the memory. Therefore, the image to be monitored and to be cautious about can be displayed on the monitor.

9 Claims, 4 Drawing Sheets

METHOD AND APPARATUS FOR DISPLAYING NOTICEABLE IMAGE AND SYSTEM FOR REMOTELY MONITORING IMAGE

BACKGROUND OF THE INVENTION

The present invention relates generally to method and apparatus for compressing images and transmitting them, and particularly to a noticeable-image displaying method and apparatus that can display only images to be paid attention to, such as changing images, and to a system for remotely monitoring such images.

In the remotely monitoring system, the need for the apparatus that digitizes images and transmits them is now fast being increased because transmission lines have been rapidly digitized as represented by the Internet. Since digitization of images will greatly increase the amount of information, an image compression technique is absolutely required. The compression systems necessary for video images here are almost global standards such as MPEG-2 and MPEG-4. These systems basically aim to precisely compress the input images to transmission systems, and they are the technology for minimizing the deterioration of image quality due to the compression.

In the image monitoring system, the observer pays attention to chiefly the changed region of the shot images that are used for observation. For example, the changed region can be seen in the cases of checking for unwanted people to go into a prohibited area, and observing traffics such as flow of traffic, and movement of persons around a targeted region (an area where valuable goods are placed such as showroom in which people should not touch showpieces). Thus, the image monitoring system does not always need all regions of the image to be monitored that are to be compressed by MPEG-2 or MPEG-4.

This type of image monitoring system using the prior art for paying attention to the changed region of image is usually used to detect intruders by infrared sensors that are provided around the prohibited area, transmit the shot images of the prohibited area, and at the same time send the detected signals to the receiver side, thus alarming the observer (person who monitors the transmitted images).

SUMMARY OF THE INVENTION

The prior art invariably needs sensors, but does not have sensors provided at positions suited to detect when the area to be detected is complicated, thus failing to detect skillfully.

In addition, the prior art cannot support for the traffic observation of car flowing of which the region to be detected cannot be clearly defined and for checking if objects within a region have moved.

Accordingly, it is an object of the invention to provide a method and apparatus for displaying noticeable, or targeted images and a system for remotely monitoring images using these method and apparatus with the above problems with the prior art being solved.

It is another object of the invention to provide a method and apparatus for displaying noticeable, or targeted images so that only the changed portion of all region of the image to be monitored can be displayed without providing special sensors, and a system for remotely monitoring images by using these method and apparatus.

In other words, according to an aspect of the invention, the scheme for the time base compression in the moving-pictures compression system is considered in view of the problems with the prior art so as to be applied to the compression mode of each of moving pictures when the receiver processes the moving pictures. In this case, this technique clears the data within a picture memory for accumulating a reference image that is supplied when the compressed data of moving pictures are decoded, thereby making it possible to display only the changed portion of all region of the image to be monitored so that the above drawbacks can be removed without providing special sensors.

The term picture, here, is a single image constituting moving pictures, and sometimes called the frame.

According to an aspect of the invention, there is provided a method for displaying noticeable, or targeted images to be cautious about in order to achieve the above objects of the invention, this method including the steps of:

receiving coded, or compressed data of moving pictures through a transmission path;

detecting the picture type of the compressed data from said received compressed data of moving pictures;

if the picture type of the received compressed data of moving pictures is intra picture, supplying predetermined image data to a monitor so that it can be displayed thereon, and also to a memory so that it can be stored therein; and if the picture type of the detected compressed data is inter picture, adding image data resulting from decoding the received compressed data and the image data stored in the memory, supplying the added data to the monitor so that it can be displayed thereon and also to the memory so that it can be stored therein. Thus, the targeted, or noticeable image of the images to be monitored can be displayed on the monitor.

An embodiment of the invention of this application detects the picture type of the compressed data from the header information of the compressed data.

In other words, this invention considers that the moving-pictures compressing system necessary for the remotely monitoring system utilizes the technique of the compression of pictures in the direction of the time base. The time-base compression technique is the technique that uses the intra picture compressed data that, when decoded, can be reproduced as a complete picture by itself, and the inter picture compressed data that can be reproduced as a complete picture when decoded and added to the previous decoded picture of which the compressed data lies on the time base before this current compressed data.

Thus, in this invention, if a coded picture type detector detects that the compressed data fed from the transmission path is intra picture compressed data, previously fixed image data is supplied to the monitor, and also to a reference picture memory. In addition, if this detector detects that the compressed data is inter picture compressed data, the normal decoding process is performed. The fixed image data can be considered to be an image of all gray as an example.

Therefore, the motionless regions of all the image to be monitored are displayed as fixed image data (for example, gray image), and the moving regions are displayed only when the inter picture data is reproduced that corresponds to the difference information of the current picture to the previous picture on the time base, thus leading to achieving a remotely monitoring system that enables the observer to pay attention only to the changed region.

Other objects, features and advantages of the invention will become apparent from the following description of the embodiments of the invention taken in conjunction with the accompanying drawings.

DETAILED DESCRIPTION OF THE EMBODIMENTS

Before the description of the invention, description will be made of an example of the arrangement for decoding in the normal remotely transmitting system having no sensors for detecting intruders, and the operation thereof with reference to FIG. 1.

Figure 1:
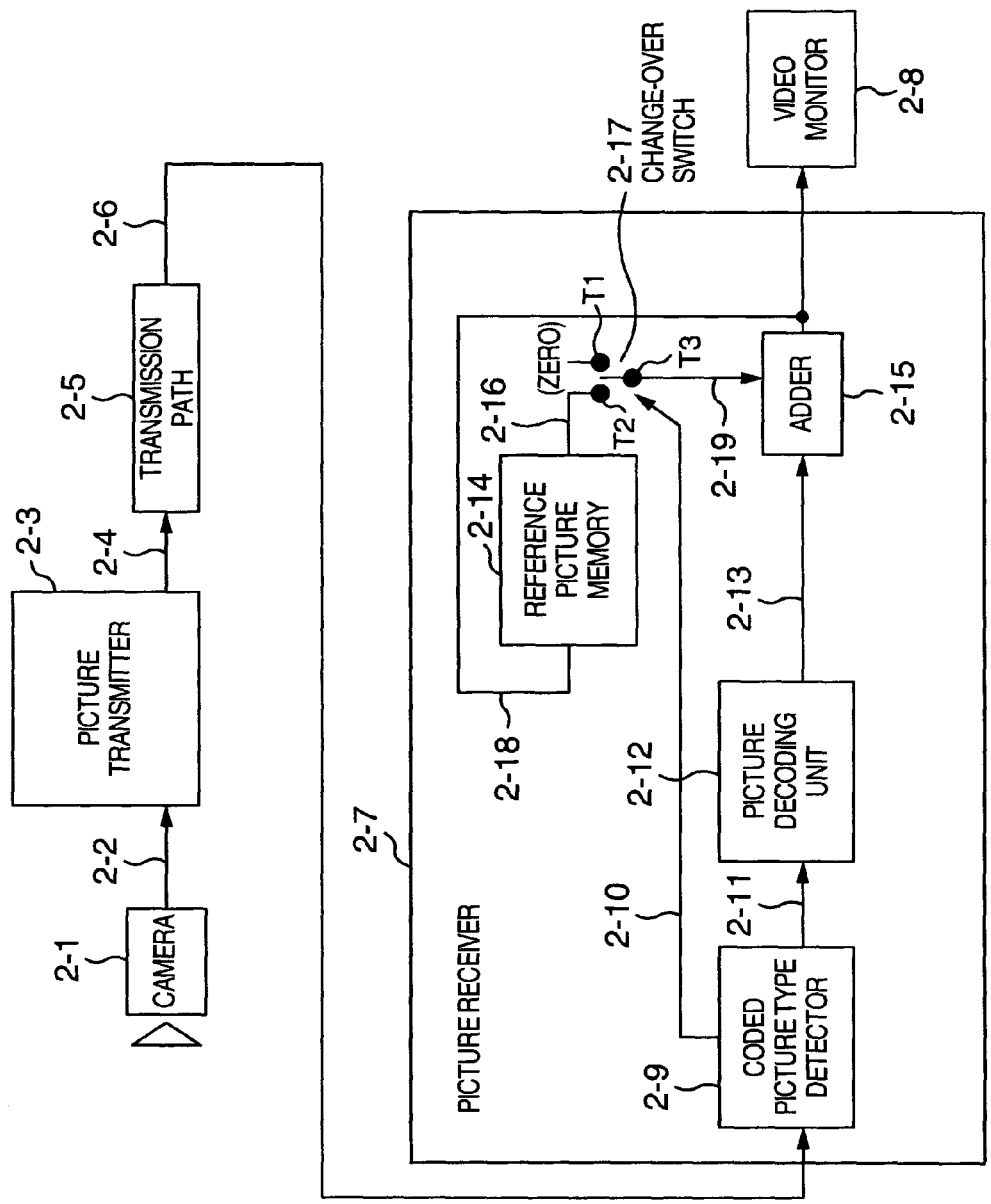
FIG. 1 is a block diagram showing the arrangement of the remotely monitoring system according to the related techniques of the invention of this application.

FIG. 1. shows an example of supplying picture data from a camera 2-1 through a transmission path 2-5 to a video monitor 2-8 and displaying it thereon. A picture transmitter 2-3 is provided on the camera 2-1 side to receive a video signal 2-2. The picture transmitter 2-3 compresses the video signal and supplies compressed data 2-4 to the transmission path 2-5. On the video monitor 2-8 side, a picture receiver 2-7 is provided to decode the compressed data 2-6 from the transmission path 2-5 and supply a video signal 2-18 to the video monitor 2-8.

Here, the compressed data 2-4, 2-6 will be mentioned. The picture compression is described in INTERNATIONAL STANDARD ISO/IEC 13818-2: 2000, "Information technology-Generic coding of moving pictures and associated audio information: Video" (document 1). The decoding in the arrangement of FIG. 1 is described in "ITU-T Rec. H. 262 (2000E), p 61.

The compressed data is generally formed of a sequence of compressed pictures as units. Here, there are two types of picture: Intra-coded (I) picture (here, called intra picture), and inter picture. The inter picture includes Predictive-coded (P) picture and Bidirectionally predictive-coded (B) picture (see "ITU-T Rec. H. 262 (2000E) Intro. 4. 1. I Temporal processing and pages 12 and 16).

Thus, the compressed data of pictures includes two types of data: intra picture compressed data and inter picture compressed data. The intra picture compressed data is the compressed data from which the picture to be monitored can be reproduced by itself. The inter picture compressed data is the compressed data from which the current picture to be monitored can be reproduced when this compressed data is added, after being decoded, to the pictures resulting from the decoding of the compressed data that lies before and after the current compressed data on the time base. In other words, the Predictive-coded (P) picture of the inter picture compressed data is produced by compressing the difference data of the current picture to the previous (past) picture, and the Bidirectionally predictive-coded (B) picture is produced by compressing the difference data of the current picture to the past and/or future picture. Usually, the intra picture compression data is represented by "I", the inter picture compressed data as the compressed data corresponding to the difference information of the current picture to the past picture lying one the time base by "P" and the inter picture compressed data as the compressed data corresponding to the difference information of the current picture to the past and/or future pictures lying on the time base by "B".

Although the inter picture of only Predictive-coded (P) picture will be described later for convenience of explanation, the present invention of this application can of course be easily applied to the inter picture including the Predictive-coded (P) picture and Bidirectionally predictive-coded (B) picture.

An example of the sequence of compressed data is shown below:

I(1)P(2)P(3) . . . P(N)I(N+1)P(N+2)P(N+3) . . .

I: intra picture compressed data, P: inter picture compressed data, and the number enclosed within parentheses represents the order of picture.

Thus, the compressed data has inter picture compressed data arranged between intra picture compressed data. The relation between these data and the reproduced data is as follows.

$$F(1)=D(I(1))$$

$$F(2)=D(P(2))+F(1)=D(P(2))+D(I(1))$$

$$F(3)=D(P(3))+F(2)=D(P(3))+D(P(2))+D(I(1))$$

$$F(N)=D(P(N))+F(N-1)=D(P(N))+D(P(N-1))+ \ldots \\ +D(P(3))+D(P(2))+D(I(1))$$

D( ): decoded data, and F( ): reproduced picture.

In other words, the inter picture compressed data represented by P in the above example is assumed here to be data of compressed difference information of the current picture to the previous picture that just precedes the current picture by a single picture on the time base. $F(2)\sim F(N-1)$ will be understood to be the data resulting from adding successive decoded difference information of the current information relative to $D(I(1))$ or $F(1)$.

Figure 2:
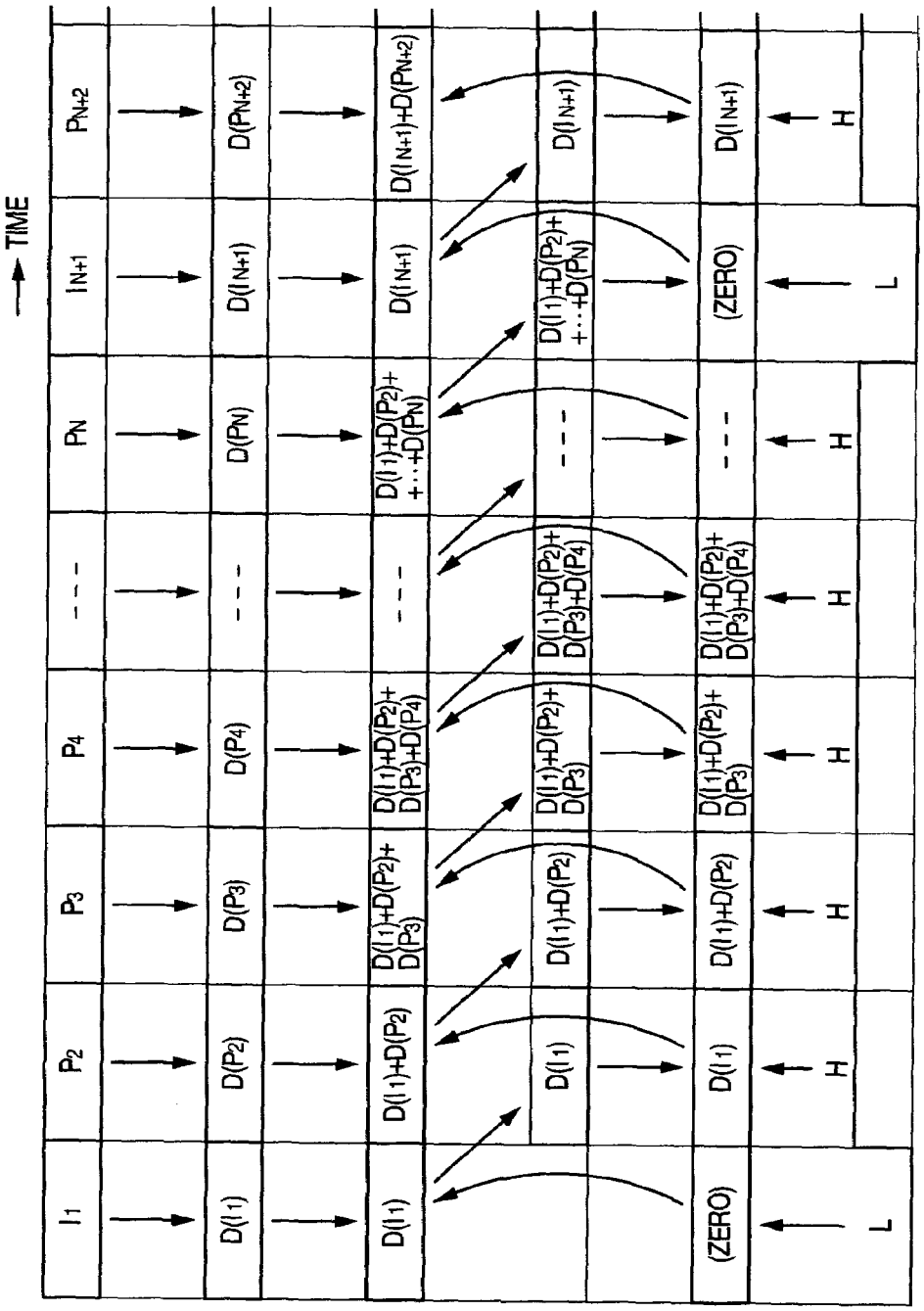
FIG. 2 is a timing chart to which reference is made in explaining the image data processing in FIG. 1.

The internal operation of the picture receiver 2-7 shown in FIG. 1 will be described with reference to the above example of compressed data and the timing chart of FIG. 2 that shows the timing of data in each portion of the arrangement of FIG. 1. First, when the intra picture compressed data I(1) is supplied from the transmission path 2-5 to the picture receiver 2-7 an encoding picture type detector 2-9 detects that it is the intra picture compressed data. Specifically, since header information showing the type of compressed data is usually added to the head of the compressed data of each picture unit, the detection is made according to this header information. This header information is described in 6.23 Picture header, page 27 of document 1, or "ITU-T Rec. H.262 (2000 E), and corresponds to the picture coding type given on Table 6-12, page 47. Then, a picture decoding processor 2-12 decodes the intra picture compressed data I (1), and supplies the decoded data D (I(1)) or F (1) as data 2-13 to an adder 2-15. In this case, since the intra picture compressed data can be reproduced from its own data alone as described above, a change-over switch 2-17 is controlled to select zero as an input to one input end of the adder 2-15 by a control signal 2-10 from the coded picture type detector 2-9. In other words, the coded picture type detector 2-9, when detecting the received compressed data to be intra picture compressed data, supplies the control signal 2-10 of, for example, a low level (L) to the change-over switch 2-17 to connect its terminal T3 to its terminal T1 so that zero value is applied to the adder 2-15 as data 2-19. Here, to the input end of a reference picture memory 2-14 is fed the data that was produced one picture before as the output data from the adder 2-15. In this case, data 2-13 and data 2-18 are the same data and correspond to the above-mentioned D (I (1)) or F (1). This data is displayed on the video monitor 2-8, and the above D (I (1)) or F (1) is accumulated in the reference picture memory 2-14.

When P (2) is then supplied, the coded picture type detector 2-9 detects that the input data is inter picture compressed data, and supplies the control signal 2-10 to the change-over switch 2-17, controlling it to select the terminal opposite to the case of intra picture compressed data. In other words, the coded picture type detector 2-9, when detecting the received compressed data to be inter picture compressed data, supplies the control signal 2-10 of, for example, a high level (H) to the change-over switch 2-17 to connect its terminal T3 to its terminal T2 so that the picture data stored in the memory 2-14 can be applied as data 2-19 to the adder 2-15.

The picture decoding processor 2-12 decodes the data P (2) and supplies data 2-13 as its output data D (P (2)) to the adder 2-15. Since the change-over switch 2-17 is controlled to select the output data from the reference picture memory 2-14 by the control signal 2-10, the data 2-18 becomes D (P (2))+D (I (1)), which is displayed as reproduced picture F (2) on the monitor 2-8. At this time, since the data 2-18 is fed to the reference picture memory 2-14, data D (P (2))+D (I (1)) is accumulated in the reference picture memory 2-14.

When data P (3) is similarly supplied, the coded picture type detector 2-9 detects that the input data is inter picture compressed data, and supplies the control signal 2-10 of the high level to the change-over switch 2-17, thus controlling it to select the terminal opposite to the case of intra picture compressed data, or the terminal T2. The picture decoding processor 2-12 decodes the data P (3), and supplies data 2-13 as D (P (3)) to the adder 2-15. Since the change-over switch 2-17 is controlled to select the output from the reference picture memory 2-14 by the control signal 2-10, the data 2-18 becomes D (P (3))+D (P (2))+D (I (1)), and it is displayed as reproduced picture F (3) on the video monitor 2-8. At this time, since data 2-18 is supplied to the reference picture memory 2-14, data of D (P (3))+D (P (2)) and D (I (1)) is accumulated in the reference picture memory 2-14.

Thus, the same operations are repeated until P (N). When data of I (N+1) is supplied, the same operation as in the case of I (1) begins. We have mentioned the arrangement and operation for decoding in the normal remotely image-transmitting system having no sensors for detecting intruders. The image transmitting system with no sensor as described above cannot detect the targeted pictures to be monitored such as intruders, and thus cannot generate an alarm signal. Therefore, the observer must always carefully watch the image displayed on the monitor.

Figure 3:
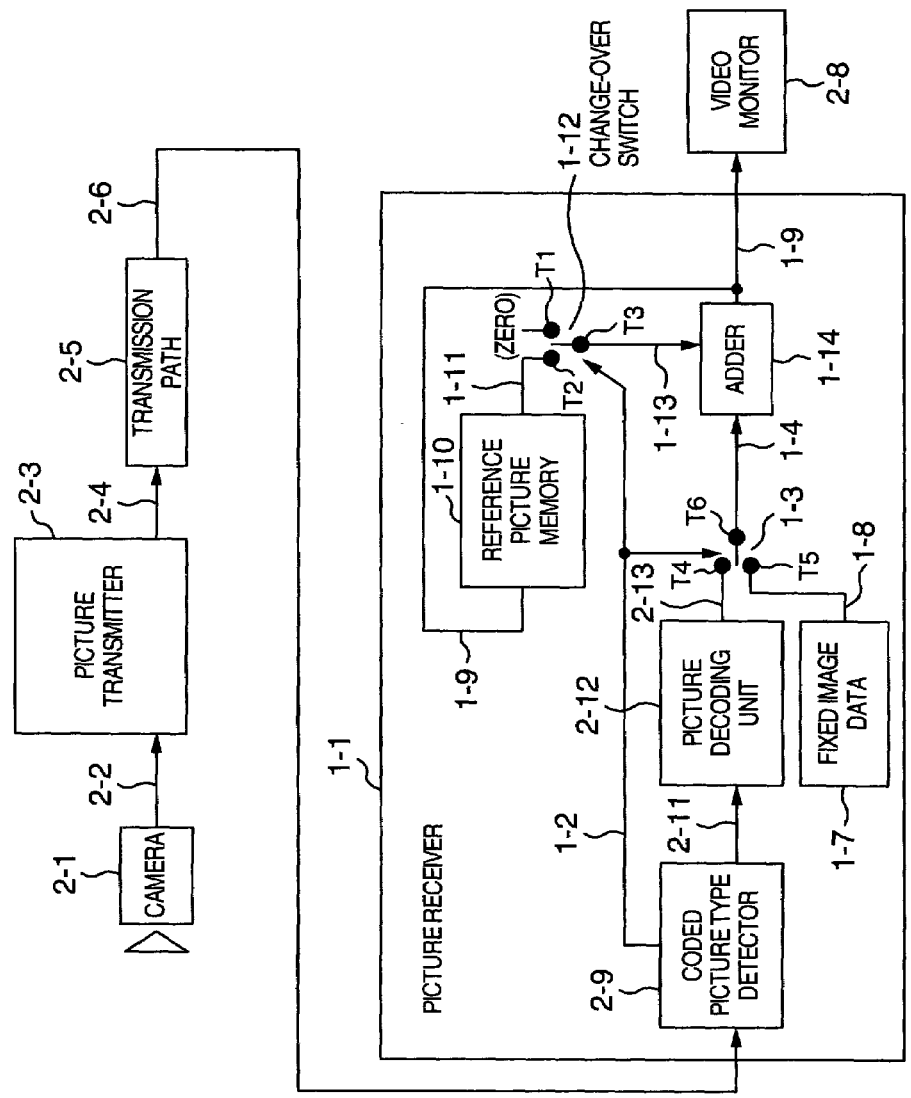
FIG. 3 is a block diagram showing the arrangement of an embodiment of the remotely monitoring system of the invention.

Thus, this invention proposes an image monitoring system capable of displaying only the targeted image to be monitored such as intruders on the monitor without using sensors. FIG. 3 shows the arrangement of one embodiment of the system according to the invention. The arrangement of FIG. 3 is the same as that of FIG. 1 except the picture receiver 1-1. In FIG. 3, like elements corresponding to those in FIG. 1 are identified by the same reference numerals, and will not be described. In the picture receiver 1-1, the coded picture type detector 2-9 receives the compressed data 2-6, and produces the compressed data 2-11 and control signal 1-2. The picture decoding processor 2-12 receives the compressed data 2-11 and produces data 2-13. A change-over switch 1-3 is controlled by the control signal to select fixed picture (background image) data F (1-8) fed from a fixed picture (background image) data memory 1-7 or the above-mentioned data 2-13, and to supplies it as data 1-4. The adder 1-14 receives data 1-4 and data 1-13 and supplies the addition result as data 1-9 to the video monitor 2-8. The data 1-9 is also supplied to the reference picture memory 1-10.

A change-over switch 1-12 is controlled by the control signal 1-2 to select data 1-11 from the reference picture memory 1-10 or zero value, and to produce data 1-13.

Figure 4:
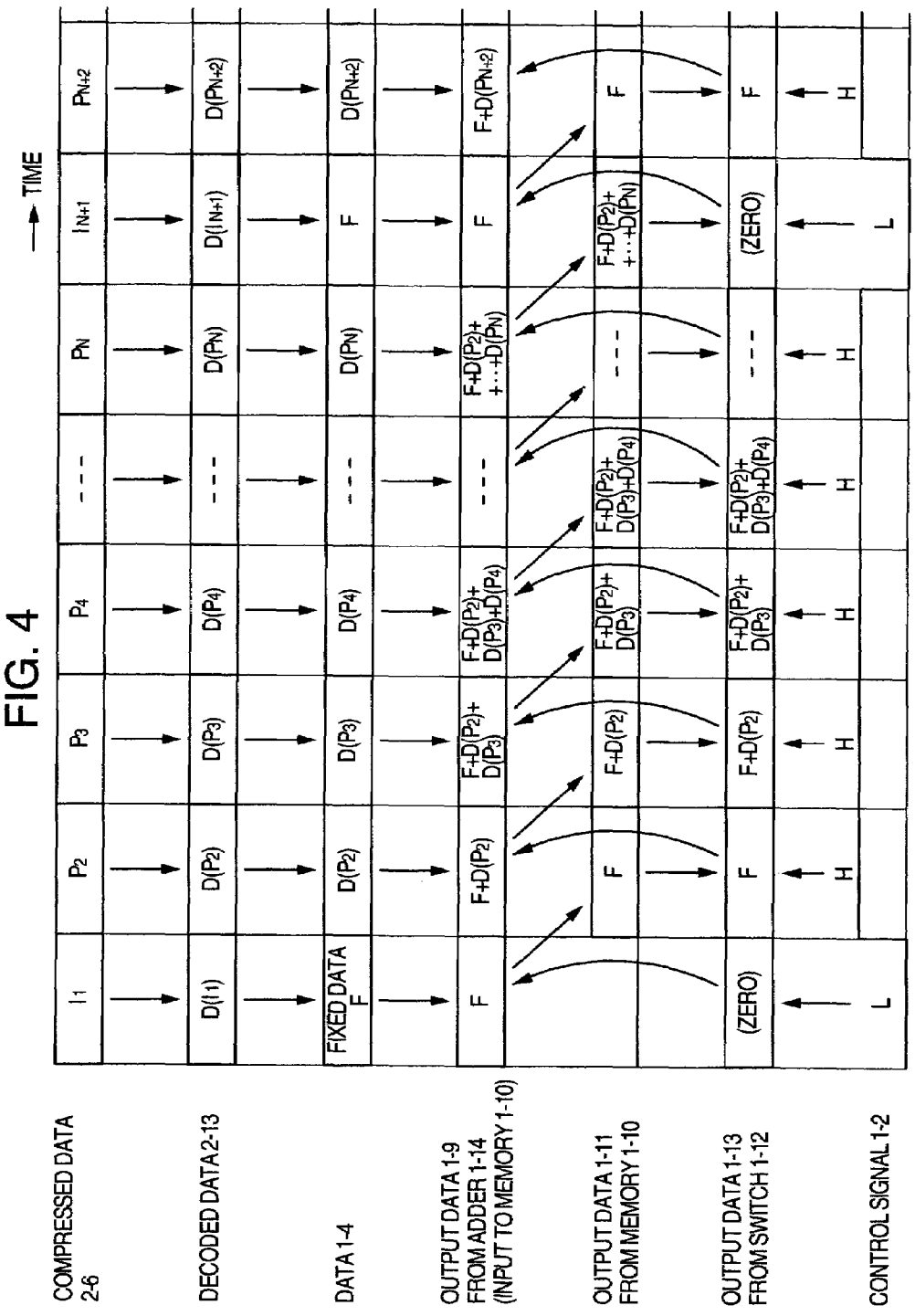
FIG. 4 is a timing chart to which reference is made in explaining the image data processing in FIG. 3.

The operation of the picture receiver 1-1 to which the same compressed data as in FIG. 1 is applied will be described with reference to FIG. 4 that is a timing chart of data in each portion of the arrangement of FIG. 3. First, when data I (1) is supplied to this picture receiver 1-1 from the transmission path 2-5, the coded picture type detector 2-9 detects that it is intra picture compressed data. Specifically, since header information (picture coding type) indicating the type of compressed data is usually added to the head of compressed data of each picture unit as described above, the type is detected according to this header information. The picture decoding processor 2-12 decodes data I (1) and produces data 2-13 as the above-mentioned decoded data D (I (1)) or F (1).

Here, the change-over switch 1-3, when the data 2-13 is intra picture compressed data, is controlled by the control signal 1-2 to select the fixed picture (background image) data F 1-8 from the fixed picture (background image) data memory 1-7, and to supply it as data 1-4 to the adder 1-14. At this time, the change-over switch 1-12 is similarly controlled by the control signal 1-2 (low level) to connect the terminal T3 to terminal T1, or to select a value of zero so that the data 1-13 of zero can be applied to the adder 1-14. Since the value of zero is applied from the change-over switch 1-12 to the adder 1-14, the adder 1-14 similarly produces data 1-4. Therefore, at this time the video monitor 2-8 displays the above fixed picture data F (1-8). Here, an image of all simple color (for example, gray) can be considered as one example of the fixed picture data F (1-8). The fixed picture data F is not limited to this image, but may be other images such as a color pattern of some colors or an image with color and/or pattern slowly changed, but not a constant (fixed) image. In a word, it may be any image as long as the changing image region can be easily recognized.

Also at this time, since data 1-9 is supplied to the reference picture memory 1-10, the gray image data of the fixed picture data memory 1-7 is accumulated in the reference picture memory 1-10.

When the difference data P (2) of the current picture to the previous picture is fed to the picture receiver 1-1, the coded picture type detector 2-9 detects that it is inter picture compressed data. Then, the detector produces the control signal 1-2 by which each of the change-over switches 1-3, 1-12 is controlled to select the terminal opposite to the case of intra picture compressed data. In other words, the control signal 1-2 becomes, for example, a high level (H), thus controlling the switches so that the terminal T6 can be connected to terminal T4, and that the terminal T3 can be connected to terminal T2. The picture decoding processor 2-12 decodes data of P (2), and produces data 2-13 as decoded data D (P (2)). Since the change-over switch 1-3 is controlled by the control signal 1-2 to select data 2-13, the data 1-4 equals to data 2-13, or to the difference data D (P (2)) of the current picture to the previous picture, and it is fed to the adder 1-4. On the other hand, since the change-over switch 1-12 is controlled by the control signal 1-2 to select the output data from the reference picture memory 1-10, or select the gray data F, the data 1-9 is D (P (2))+gray image, and it is supplied to the video monitor 2-8. At this time, the video monitor 2-8 displays the difference data, variation image of the current picture to the reference picture superimposed against the background gray. At this time, since data 1-9 is fed to the reference picture memory 1-10, this D (P (2))+gray image is accumulated in the reference picture memory 1-10.

When data P (3) is similarly supplied to the picture receiver 1-1, the coded picture type detector 2-9 detects that it is inter picture compressed data, and supplies the control signal 1-2 to each of the change-over switches 1-3, 1-12, thus controlling them to select the terminals opposite to the case of intra picture compressed data. The picture decoding processor 2-12 decodes data P (3), and produces data 2-13 as D (P (3)). Since the change-over switch 1-3 is controlled by the control signal 1-2 to select data 2-13, the data 1-4 equals data 2-13, or to the difference data D (P (3)) of the current picture to the previous picture, and it is fed to the adder 1-14. On the other hand, since the change-over switch 1-12 is controlled by the control signal 1-2 to select the output data from the reference picture memory 1-10, or D (P (2))+gray image F, the data 1-9 is D (P (3))+D (P (2))+gray image, and it is fed to the video monitor 2-8. At this time, the video monitor 2-8 displays the difference data, or variation of the current picture to the reference picture, superimposed against the background gray.

At this time, since the data 1-9 is fed to the reference picture memory 1-10, data of D (P (3))+D (P (2))+gray image F is accumulated in the reference picture memory.

Thus, when I (N+1) is fed after the same operations are repeated until P (N), the same operation as in the above case of I (1) begins. That is, according to the invention, when P (N) is supplied to the picture receiver, the video monitor 2-8 displays as follows.

$$G(N) = D(P(N)) + G(N-1)$$
$$= D(P(N)) + D(P(N-1)) + \ldots + D(P(3)) + D(P(2)) + \text{gray image}$$

D( ): decoded data, and G( ): displayed picture.

From the above equation, it will be clear in this invention that only the difference information can be displayed against the background of a background image (a fixed image, for example, all gray image). The result is that the difference information is displayed for the moving region and the gray image for the motionless region on the whole screen. Thus, it is possible to achieve a remotely monitoring system using images most suitable for paying attention to the moving region within the picture to be monitored.

While an example of the fixed image data 1-7 is gray image as in the above description, other image data can be used in this invention.

According to the invention, since only the region including a motion that is particularly important in a picture to be monitored can be displayed by receiving the difference information of the motion, the observer can easily grasp the situation to be cautious about from the received image.

In addition, since the region in which a motion has occurred even in a flash is displayed differently from the fixed image data while the intra picture compressed data is being processed, it is possible to overlook or prevent this region.

Moreover, since this invention relates to the picture receiver, the compressed data used so far can be utilized as it is, and even the compressed data filed by the prior art can be used with the same effect.

Therefore, the invention can propose a remotely monitoring system most suitable for the observer to keep cautious about the movement within the image to be monitored.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of displaying noticeable images, comprising the steps of:
    receiving coded or compressed data of moving pictures through a transmission path;
    detecting a picture type of said compressed data of said received compressed data of moving pictures;
    if the picture type of said received compressed data of moving pictures is intra picture, supplying predetermined image data to a monitor so that said predetermined image data can be displayed thereon, and to a memory so that said predetermined data can be stored in said memory; and
    if the picture type of said detected compressed data is inter picture, adding image data resulting from decoding said received compressed data and image data stored in said memory, and supplying data resulting from the addition to said monitor so that said data resulting from the addition can be displayed thereon and to said memory so that said data resulting from the addition can be stored in said memory,
    wherein said predetermined image data is data unrelated to intra-picture compressed data included in said received compressed data.

2. A method according to claim 1, wherein said step of detecting the picture type of said compressed data detects the picture type of said compressed data from header information of said compressed data.

3. A method according to claim 1, wherein said predetermined image data is selected to be fixed image data of a fixed color.

4. An apparatus for processing and displaying noticeable images, comprising:
    a detector for detecting a picture type of coded or compressed data of moving pictures received through a transmission path;
    a decoding processor for decoding said received compressed data and producing decoded image data;
    a memory for storing image data fed from an adder; and
    said adder that, depending on the picture type of said compressed data detected by said detector, either supplies predetermined image data to a monitor so that said predetermined image data can be displayed on said monitor and stores said predetermined image data in said memory, or adds said decoded image data from said decoding processor and image data stored in said memory, and supplies data resulting from the addition to said monitor so that said data resulting from the addition can be displayed on said monitor and to said memory so that said data resulting from the addition can be stored in said memory,
    wherein said predetermined image data is data unrelated to intra-picture compressed data included in said received compressed data.

5. An apparatus according to claim 4, wherein said detector detects the picture type of said compressed data from the header information of said compressed data.

6. An apparatus according to claim 4, wherein said predetermined image data is selected to be fixed image data of a predetermined color.

7. A remotery monitoring system comprising:

a transmitter for transmitting coded or compressed data of moving pictures through a transmission path; and a receiver for receiving said coded or compressed data of moving pictures transmitted through said transmission path, decoding said compressed data to produce decoded image data of the moving pictures and displaying said decoded data of moving pictures, wherein said receiver comprises:

a detector for detecting a picture type of said coded or compressed data of moving pictures received through said transmission path a decoding processor for decoding said received compressed data and producing said decoded image data, a memory for storing image data from an adder, and wherein said adder that, depending on the picture type of said compressed data detected by said detector, supplies predetermined image data to a monitor so that said predetermined image data can be displayed thereon and to said memory so that said predetermined image data can be stored therein, or adds said decoded image data fed from said decoding processor and image data stored in said memory and supplies added data resulting from the addition to said monitor so that said added data can be displayed thereon and to said memory so that said added data can be stored therein, wherein said predetermined image data is data unrelated to intra-picture compressed data included in said received compressed data.

8. A remotely monitoring system according to claim 7, wherein said detector detects the picture type of said compressed data from the header information of said compressed data.

9. A remotely monitoring system according to claim 7, wherein said predetermined image data is selected to be fixed image data of a predetermined color.

* * * * *